United States Patent
Hendrey

(10) Patent No.: US 10,467,263 B2
(45) Date of Patent: Nov. 5, 2019

(54) EFFICIENT POINT-IN-POLYGON INDEXING TECHNIQUE TO VISUALIZE DATA POINTS BOUNDED BY GEOMETRIC REGIONS

(71) Applicant: SPLUNK, Inc., San Francisco, CA (US)

(72) Inventor: Geoffrey R. Hendrey, San Francisco, CA (US)

(73) Assignee: SPLUNK INC., San Francisco, CA (US)

(*) Notice: Subject to any disclaimer, the term of this patent is extended or adjusted under 35 U.S.C. 154(b) by 0 days.

(21) Appl. No.: 15/665,247

(22) Filed: Jul. 31, 2017

(65) Prior Publication Data

US 2017/0329800 A1   Nov. 16, 2017

Related U.S. Application Data

(63) Continuation of application No. 14/606,387, filed on Jan. 27, 2015, now Pat. No. 9,767,122.

(51) Int. Cl.
| | | |
|---|---|---|
| G06F 16/29 | (2019.01) | |
| G09G 5/00 | (2006.01) | |
| G09G 5/02 | (2006.01) | |

(52) U.S. Cl.
CPC .............. *G06F 16/29* (2019.01); *G09G 5/003* (2013.01); *G09G 5/02* (2013.01)

(58) Field of Classification Search
None
See application file for complete search history.

(56) References Cited

U.S. PATENT DOCUMENTS

| | | | |
|---|---|---|---|
| 5,454,068 | A | 9/1995 | Ramanujam |
| 5,668,940 | A | 9/1997 | Steiner et al. |
| 5,818,460 | A | 10/1998 | Covey et al. |
| 6,172,680 | B1 | 1/2001 | Wong et al. |
| 6,172,682 | B1 | 1/2001 | Claiborne et al. |
| 6,215,501 | B1 | 4/2001 | Takita |
| 6,363,392 | B1 * | 3/2002 | Halstead ............. G06F 16/9537 |

(Continued)

OTHER PUBLICATIONS

Splunk, Hunk: Splunk Analytics for Hadoop Intro-Part 2, Jul. 7, 2013.*

(Continued)

*Primary Examiner* — Hilina K Demeter
(74) *Attorney, Agent, or Firm* — Shook, Hardy & Bacon, L.L.P.

(57) ABSTRACT

A system that displays geographic data is disclosed. The system obtains polygons that define a set of geographic regions. Then, the system projects rays from endpoints of the line segments that define the polygons onto a reference line to form intersection points. For each interval between pairs of consecutive intersection points on the reference line, the system keeps track of open line segments that project onto the interval. For each data point in a set of data points, the system identifies a relevant interval on the reference line that the data point projects onto, and performs a crossing number operation to identify polygons that the data point falls into, and the system increments a count for each polygon that the data point falls into. Finally, the system displays the set of geographic regions in a manner that indicates a number of data points that fall into each geographic region.

30 Claims, 13 Drawing Sheets

(56) References Cited

U.S. PATENT DOCUMENTS

| | | |
|---|---|---|
| 7,287,002 B1 | 10/2007 | Asher et al. |
| 7,952,583 B2 | 5/2011 | Waechter et al. |
| 8,072,452 B1 | 12/2011 | Brown |
| 8,243,070 B1 | 8/2012 | Brown |
| 8,379,025 B1 | 2/2013 | Carr et al. |
| 8,416,122 B1 * | 4/2013 | Pedersen ................ G06F 17/10 342/95 |
| 8,515,963 B1 | 8/2013 | Blank, Jr. et al. |
| 9,002,854 B2 | 4/2015 | Baum et al. |
| 9,082,189 B2 | 7/2015 | Look et al. |
| 9,607,414 B2 | 3/2017 | Hendrey |
| 9,767,122 B2 | 9/2017 | Hendrey |
| 9,842,432 B2 | 12/2017 | Hendrey |
| 10,055,886 B2 | 8/2018 | Hendrey |
| 2002/0180751 A1 | 12/2002 | Rozzi |
| 2002/0188581 A1 | 12/2002 | Fortin et al. |
| 2003/0074471 A1 | 4/2003 | Anderson et al. |
| 2005/0078326 A1 | 4/2005 | Stokes et al. |
| 2005/0140694 A1 | 6/2005 | Subramanian et al. |
| 2005/0257204 A1 | 11/2005 | Bryant et al. |
| 2006/0176297 A1 | 8/2006 | Kim et al. |
| 2006/0197763 A1 | 9/2006 | Harrison et al. |
| 2007/0126739 A1 | 6/2007 | Cartier |
| 2007/0139440 A1 | 6/2007 | Crow et al. |
| 2007/0236498 A1 | 10/2007 | Higuchi et al. |
| 2008/0143735 A1 | 6/2008 | Besley et al. |
| 2009/0027415 A1 | 1/2009 | Dispoto et al. |
| 2009/0051706 A1 | 2/2009 | Fleming |
| 2010/0091016 A1 | 4/2010 | Kazar et al. |
| 2010/0111370 A1 | 5/2010 | Black et al. |
| 2010/0217480 A1 | 8/2010 | Link, II |
| 2011/0122130 A1 | 5/2011 | Vesely et al. |
| 2011/0295564 A1 | 12/2011 | Chazal et al. |
| 2011/0320319 A1 * | 12/2011 | Streich ................ G06Q 30/06 705/27.1 |
| 2012/0054195 A1 | 3/2012 | Hu et al. |
| 2012/0256915 A1 | 10/2012 | Jenkins |
| 2012/0274984 A1 | 11/2012 | Wang et al. |
| 2012/0274985 A1 | 11/2012 | Bernal et al. |
| 2013/0019314 A1 | 1/2013 | Ji et al. |
| 2013/0076732 A1 | 3/2013 | Cervelli et al. |
| 2013/0085847 A1 | 4/2013 | Dyor et al. |
| 2013/0120391 A1 | 5/2013 | Brown |
| 2013/0163053 A1 | 6/2013 | Wang et al. |
| 2013/0218873 A1 | 8/2013 | Lassley et al. |
| 2013/0328882 A1 | 12/2013 | Pirwani et al. |
| 2014/0043330 A1 | 2/2014 | Ceylan et al. |
| 2014/0043342 A1 | 2/2014 | Goel et al. |
| 2014/0236889 A1 | 8/2014 | Vasan et al. |
| 2014/0282560 A1 | 9/2014 | Hutton et al. |
| 2015/0077276 A1 | 3/2015 | Mitchell et al. |
| 2015/0081212 A1 | 3/2015 | Mitchell et al. |
| 2015/0269250 A1 | 9/2015 | Basovnik et al. |
| 2015/0310636 A1 | 10/2015 | Yoo et al. |
| 2015/0332505 A1 | 11/2015 | Wang et al. |
| 2016/0088546 A1 | 3/2016 | Birch et al. |

OTHER PUBLICATIONS

Final Office Action dated Dec. 4, 2017 in U.S. Appl. No. 14/606,396, 15 pages.

Reshetov et al., Multi-Level Ray Tracing Algorithm, Jul. 31, 2005, pp. 1176-1185.

Splunk, "Hunk: Splunk Analytics for Hadoop Intro—Part 2", Jul. 7, 2013, 6 pages.

Non-Final Office Action dated Oct. 20, 2017 in U.S. Appl. No. 15/714,841, 7 pages.

* cited by examiner

Original Search: 501
search "error | stats count BY host

Sent to peers: 502
search "error | prestats count BY host (map)

Executed by search head: 503
Merge prestats results received from peers (reduce)

Search Screen 600

Search | Pivot | Reports | Alerts | Dashboards | Search & Reporting

New Search

Search Bar 602 — Save as menu → Save As ∨ Close

✓ 36,819 events (before 4/30/14 2:19:02.000 PM)  Job ∨ ⏸ ■ ↗ ↓ ⊕  All time ∨  🔍

Time Range Picker 612 — Smart Mode ∨

Events (36,819) | Statistics | Visualization ← Search Results Tabs 604

Format Timeline ∨  − Zoom Out  + Zoom to Selection  × Deselect ← Search action buttons Timeline 605

1 hour per column

‹ Hide Fields  ⋮≡ All Fields | List ∨  Format ∨  20 Per Page ∨  ‹ Prev  1  2  3  4  5  6  7  8  9  ...  Next ›

Fields Sidebar 606

Selected Fields
- a host 3
- a source 3
- a sourcetype 1

Interesting Fields
- a action 5
- # bytes 100+
- a categoryId 8
- a clientip 100+
- # date_hour 24
- # date_mday 8
- # date_minute 60

| i | Time | Event |
|---|------|-------|
| › | 4/28/14<br>6:22:16.000 PM | 91.205.189.15 - - [28/Apr/2014:18:22:16] "GET /oldlink?itemId=EST-14&JSESSIONID=SD6SL7FF<br>7ADFF53113 HTTP 1.1" 200 1665 "http://www.buttercupgames.com/oldlink?itemId=EST-14" "Moz<br>illa/5.0 (Windwos NT 6.1; WOW 64) AppleWebKit/536.5 (KHTML, like Gecko) Chrome/19.0.1084.<br>46 Safari/536.5" 159<br>host = www2   source = tutorialdata.zip:./www2/access.log   sourcetype = access_combined_wcookie |
| › | 4/28/14<br>6:20:56.000 PM | 182.236.164.11 - - [28/Apr/2014:18:20:56] "GET /cart.do?action=addtocart&itemId=EST-15&p<br>roductId=85-AG-G09&JSESSIONID=SD6SL8FF10ADFF53101 HTTP 1.1" 200 2252 "http://www.butterc<br>upgames.com/oldlink?itemID=EST-15" "Mozilla/5.0 (Macintosh; Intel Mac OS X 10_7_4) Apple<br>WebKit/536.5 (KHTML, like Gecko) Chrome/19.0.1084.46 Safari/536.5" 506<br>host = www1   source = tutorialdata.zip:./www1/access.log   sourcetype = access_combined_wcookie |
| › | 4/28/14<br>6:20:55.000 PM | 182.236.164.11 - - [28/Apr/2014:18:20:56] "POST /oldlink?itemId=EST-18&JSESSIONID=SD6SL8<br>FF10ADFF53101 HTTP 1.1" 408 893 "http://www.buttercupgames.com/product.screen?productId=<br>SF-BVS-G01" "Mozilla/5.0 (Macintosh; Intel Mac OS X 10_7_4) AppleWebKit/536.5 (KHTML, li<br>ke Gecko) Chrome/19.0.1084.46 Safari/536.5" 134<br>host = www1   source = tutorialdata.zip:./www1/access.log   sourcetype = access_combined_wcookie |

Events List 608

| Data Summary | | | |
|---|---|---|---|
| Hosts (5) | Sources (8) | Sourcetypes (3) | |
| filter | | | |
| Host ⇕ | | Count ⇕ | Last Update ⇕ |
| mailsv | ⋅|∨ | 9,829 | 4/29/14 1:32:47.000 PM |
| vendor_sales | ⋅|∨ | 30,244 | 4/29/14 1:32:46.000 PM |
| www1 | ⋅|∨ | 24,221 | 4/29/14 1:32:44.000 PM |
| www2 | ⋅|∨ | 22,595 | 4/29/14 1:32:47.000 PM |
| www3 | ⋅|∨ | 22,975 | 4/29/14 1:32:45.000 PM |

FIG. 6B

EFFICIENT POINT-IN-POLYGON INDEXING TECHNIQUE TO VISUALIZE DATA POINTS BOUNDED BY GEOMETRIC REGIONS

CROSS-REFERENCE TO RELATED APPLICATIONS

This application is a continuation of and hereby claims priority to U.S. application Ser. No. 14/606,387, filed Jan. 27, 2015, entitled "Efficient Point-In-Polygon Indexing Technique to Facilitate Displaying Geographic Data," the contents of which are hereby incorporated reference.

BACKGROUND

1. Field of the Invention

The disclosed embodiments generally relate to techniques for querying and viewing geographic data sets. More specifically, the disclosed embodiments relate to a point-in-polygon indexing technique to facilitate viewing statistical data associated with geographic regions.

2. Related Art

The point-in-polygon (PIP) problem has important applications in a variety of disciplines, including geographic information systems (GISs), computer games, computer vision applications and computer-aided design (CAD). Solutions to the PIP problem have been motivated by the requirements of choropleth maps for geographic information systems (GISs). A choropleth map is a type of "heat map" in which polygons are shaded based on the quantity or density of certain subjects of interest within the polygon. For example, one can count the number of Starbucks™ stores within each state (the state boundaries being the set of polygons), and then visually present the information by filling in each polygon with a color or hue that reflects the count of Starbucks™ stores in the given polygon. In this example, the digitized boundaries of the US states may contain hundreds of thousands of points for each state. Hence, application of a brute force crossing number (CN) technique to solve the PIP problem involves iterating over all of the many vertices in each state boundary. While some performance optimizations exist for the special case of non-overlapping polygons, in general such optimizations are impossible or impractical. Furthermore, the CN technique needs to be run on each data point. Consequently, processing even a small number of data points against a large GIS boundary dataset is computationally expensive.

Hence, what is needed is a system that facilitates efficiently solving the PIP problem without the limitations of existing techniques.

BRIEF DESCRIPTION OF THE DRAWINGS

FIG. 5 illustrates an exemplary search query received from a client and executed by search peers in accordance with the disclosed embodiments.

FIG. 6A illustrates a search screen in accordance with the disclosed embodiments.

FIG. 6B illustrates a data summary dialog that enables a user to select various data sources in accordance with the disclosed embodiments.

Figure 1:
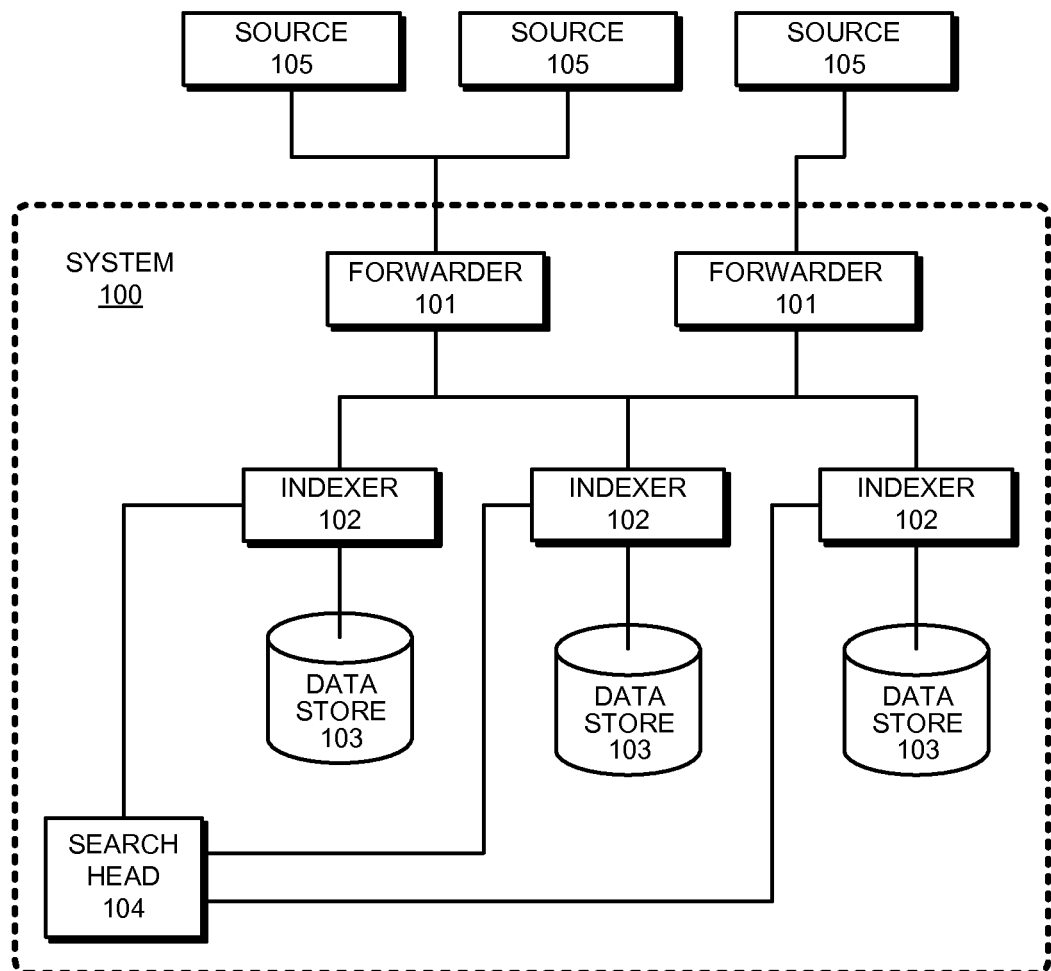
FIG. 1 presents a block diagram of an event-processing system in accordance with the disclosed embodiments.

Table 1 illustrates sorted point structures in accordance with the disclosed embodiments.

Table 2 illustrates sorted point structures with corresponding lists of open segments in accordance with the disclosed embodiments.

Table 3 illustrates how non-final rows can be struck out in accordance with the disclosed embodiments.

Table 4 illustrates Y ranges and corresponding open segments in accordance with the disclosed embodiments.

Table 5 illustrates how non-final rows can be struck out in accordance with the disclosed embodiments.

Table 6 illustrates how the data structure can be modified for modulo 3 storage in accordance with the disclosed embodiments.

DETAILED DESCRIPTION

The disclosed embodiments relate to a system that facilitates querying and displaying geographic data. This system is described in more detail below, but we first describe the structure of an event-based framework in which this system operates.

1.1 System Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that was selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a pre-defined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, UM Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
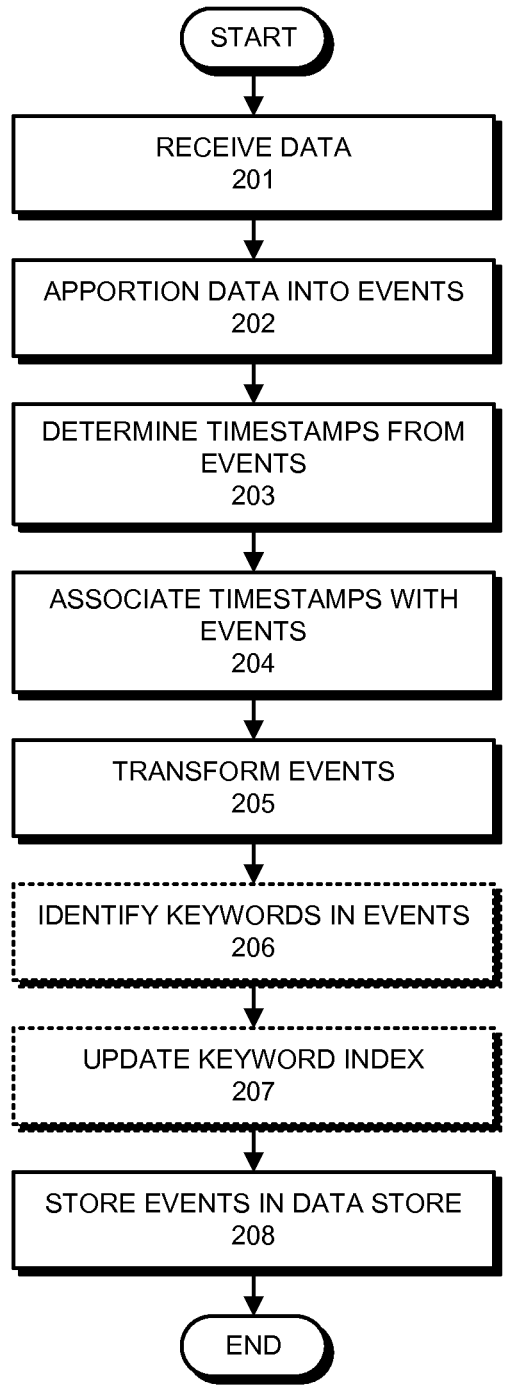
FIG. 2 presents a flowchart illustrating how indexers process, index, and store data received from forwarders in accordance with the disclosed embodiments.

FIG. 2 presents a flow chart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S.

patent application Ser. No. 14/266,812 filed on 30 Apr. 2014, and in U.S. patent application Ser. No. 14/266,817 also filed on 30 Apr. 2014.

1.4 Query Processing

Figure 3:
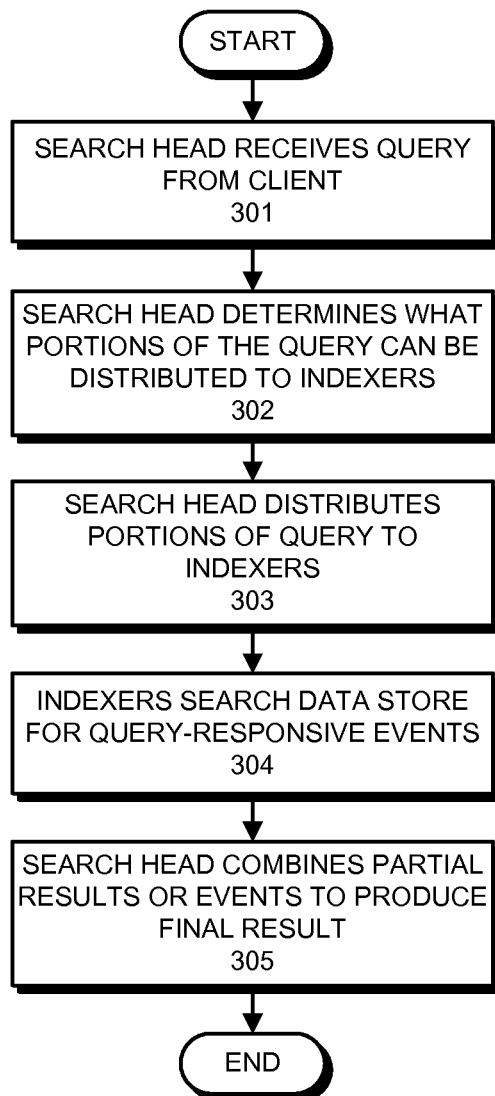
FIG. 3 presents a flowchart illustrating how a search head and indexers perform a search query in accordance with the disclosed embodiments.

FIG. 3 presents a flow chart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
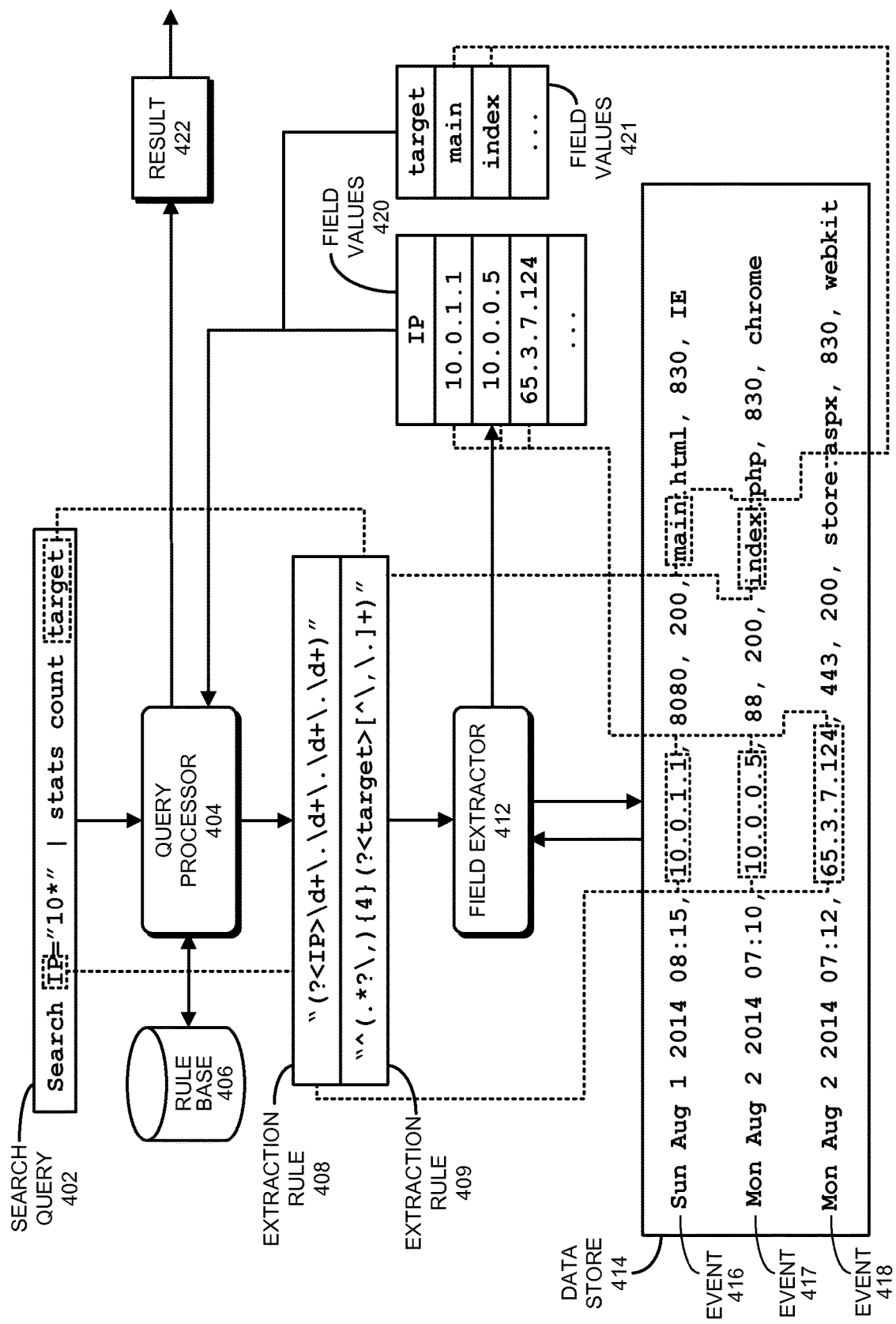
FIG. 4 presents a block diagram of a system for processing search requests that uses extraction rules for field values in accordance with the disclosed embodiments.

FIG. 4 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in the Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 4, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that has been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

FIG. 6A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 5 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

System for Processing and Displaying Geographic Data

Figure 7:
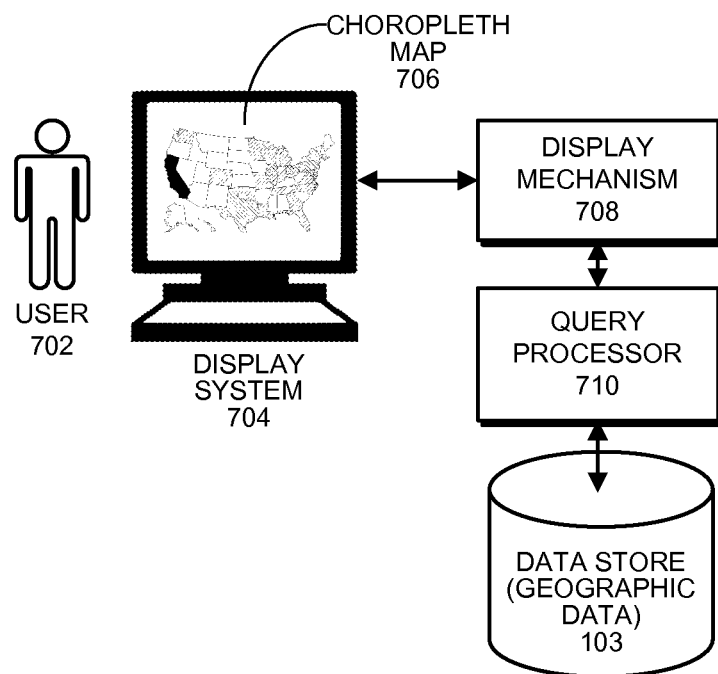
FIG. 7 illustrates a system for processing and displaying geographic data in accordance with the disclosed embodiments.

FIG. 7 illustrates a system for processing and displaying geographic data in accordance with the disclosed embodiments. This system includes a data store 103 containing geographic data, such as population statistics associated with geographic regions. It also includes a query processor 710 configured to execute queries involving geographic data. Results generated by query processor 710 can be formatted using display mechanism 708 and then displayed to a user 702 through a display system 704. For example, as illustrated in FIG. 7, the results can be displayed using a choropleth map 706, wherein each geographic region is shaded, patterned or colored in proportion to a number of data points that fall into the geographic region. The process of generating a choropleth map (or some other representation of geographic data) is described in more detail below.

Fast Point-in-Polygon Indexing

Figure 8:
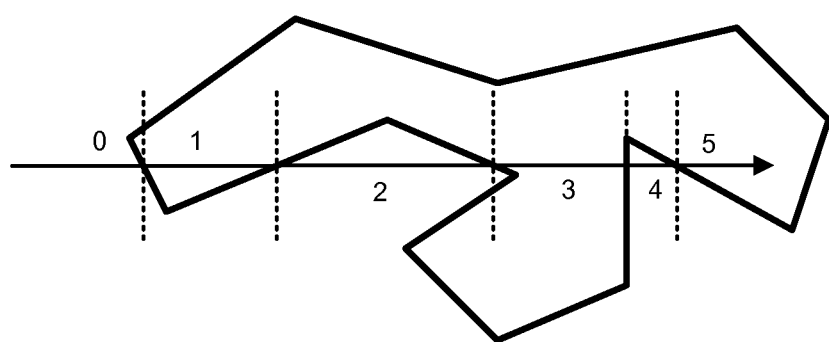
FIG. 8 illustrates a ray being cast across a polygon with crossing number (CN) counts in accordance with the disclosed embodiments.

The point-in-polygon (PIP) problem is typically solved using either the crossing number (CN) technique or the winding number (WN) technique. For example, the CN technique is depicted in FIG. 8 for a single polygon and single point located at the end of the arrow labeled "5". A ray is cast from the exterior of the polygon to the point being tested and the counter is incremented for each edge that is crossed. Although in FIG. 8 the counter is shown as being incremented in the order in which the ray intersects the polygon's boundary segments, there is no requirement that the segments be tested in any particular order. Typically, the line segments are iterated either clockwise or anti-clockwise from an arbitrary "starting point" in the polygon boundary. The CN technique declares a point to be inside the polygon if the total crossing count is odd. Intuitively this makes sense, because crossing into a boundary from the exterior places the ray inside the shape, and the ray can only exit the shape by crossing the boundary again, thus flipping the count from odd to even. Note that the ray may be cast in any direction; the choice of a horizontal ray in FIG. 8 is arbitrary. Furthermore, it does not matter whether the ray is cast from the point to infinity in any direction, or from infinity to the point. The crossing count will be the same regardless of whether the ray is cast inward or outward.

Because this disclosure focuses on accelerating the CN technique, and because the CN technique has the same computational complexity as the WN technique, we will not describe the WN technique further other than to say that it iterates the vertices of the polygon and counts the number of full turns around the point being tested.

There are a number of existing approaches to accelerating PIP testing. Perhaps the most common is to insert the polygons into a spatial data structure such as an R-Tree. One example of this is the PostGIS™ database. The R-Tree can be queried to retrieve a set of candidate polygons based on rectangular bounding boxes surrounding each polygon. This eliminates polygons whose bounding boxes do not surround the point in question. Each surviving candidate must then be tested using either CN or WN to determine if the point in question falls inside, outside or on the edge of the candidate. Because candidates may contain large numbers of vertices, and because there may exist many candidates, the CN and WN techniques are still the bottleneck because they are both O(n) where n is the number of vertices in the polygon being tested. More recently, an approach has been proposed that builds an index specifically for PIP testing; however, this approach suffers from an exponential index build complexity of O(n2.6). Both the R-Tree and the above-described index-building approach rely on in-memory tree structures. The performance of these in-memory tree structures when stored on spinning disk media as opposed to RAM, depends on the depth of the tree because each link traversal in a tree search requires a seek operation, and seek operations are slow on traditional spinning media.

The new indexing technique described in this disclosure involves casting horizontal rays from polygon segments onto a reference line and then storing the set of segments intersected by the rays. For a given point to be PIP tested, the set of intersected segments across all polygons in the index can then be retrieved from the index, and fed directly to the CN technique. This obviates the need to iterate the boundaries of the polygons to determine which segments intersect a ray emanating from the point to be tested.

Figure 9:
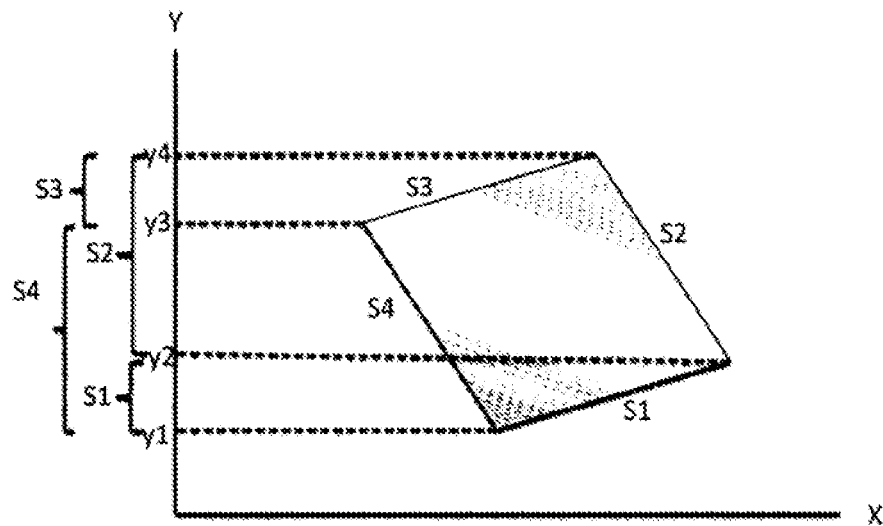
FIG. 9 illustrates polygon segments projected onto a y-axis in accordance with the disclosed embodiments.

FIG. 9 shows a polygon labeled "A", and the projection of line segments S1 through S4 onto the y-axis. Note that segment projections overlap on the y-axis, and the set of overlapping segments is constant over any continuous range of y values bounded by the projection of 2 successive points on the y-axis. For instance, referring to FIG. 9, for the continuous range of y values [y2, y3) one can see that a horizontal ray fixed at any y value in the range will intersect the set of segments [S2, S4]. Therefore, an indexing mechanism can be designed such that for a given point to be PIP tested, the y coordinate of the point is used to look up a corresponding set of intersected segments based upon which of a finite set of y-ranges the point's y value falls inside.

TABLE 1

{S1, —, y1, O}
{S4, —, y1, O}
{S1, —, y2, C}
{S2, —, y2, O}
{S3, —, y3, O}
{S4, —, y3, C}
{S2, —, y4, C}
{S3, —, y4, C}

We now describe how to build such an index that comprises sorted y-ranges, and their corresponding set of intersected segments. Consider a point data structure for describing the points as {segmentId, x, y, order}. The "order" field can assume the values O or C for "opening" or "closing". An "opening" point for a segment corresponds to the point with the smaller Y-coordinate. A "closing" point is the segment's point with the larger Y-coordinate. For example, the coordinate of S1 with the smaller y value would be {S1, --, y1, O} (the x values are shown as " - -"). By sorting the point structures based on their y value from smallest to largest, we obtain the ordering with ascending y values illustrated in Table 1.

By traversing this sorted set of point data structures from beginning to end, we can create a corresponding list of open segments (that is to say, segments that would intersect a horizontal ray projected from point x,y). As we traverse the listed point structures shown in Table 1, we can perform the following operation: if the order field is "O", then we add the corresponding segment ID to the list of open segments. If the order field is "C", then we remove the corresponding segment ID from the list. Hereafter, we call this the "opening and closing technique." Following this simple procedure, the list of open segments is shown next to each point data structure as is illustrated in Table 2 below.

TABLE 2

{S1, —, y1, O}: [S1]
{S4, —, y1, O}: [S1, S4]
{S1, —, y2, C}: [S4]
{S2, —, y2, O}: [S2, S4]
{S3, —, y3, O}: [S2, S3, S4]
{S4, —, y3, C}: [S2, S3]
{S2, —, y4, C}: [S3]
{S3, —, y4, C}: [ ]

For the list shown in Table 2, the final list for a given y value provides the set of open segments between the current y value and the next y value. Table 3 illustrates this by striking out the non-final segments.

From the remaining adjacent y values (those not struck out), we can extract the y coordinates, and the open lists to create continuous y ranges, and corresponding lists of open segments, as shown in Table 4, including the ranges from negativity infinity, and to positive infinity on the y-axis.

TABLE 3

{S1, —, y1, O}: [S1]
{S4, —, y1, O}: [S1, S4]
{S1, —, y2, C}: [S4]
{S2, —, y2, O}: [S2, S4]
{S3, —, y3, O}: [S2, S3, S4]
{S4, —, y3, C}: [S2, S3]
{S2, —, y4, C}: [S3]
{S3, —, y4, C}: [ ]

TABLE 4

[-INF, y1): [ ]
[y1, y2): [S1, S4]
[y2, y3): [S2, S4]
[y3, y4): [S2, S3]
[y4, INF): [ ]

Figure 10:
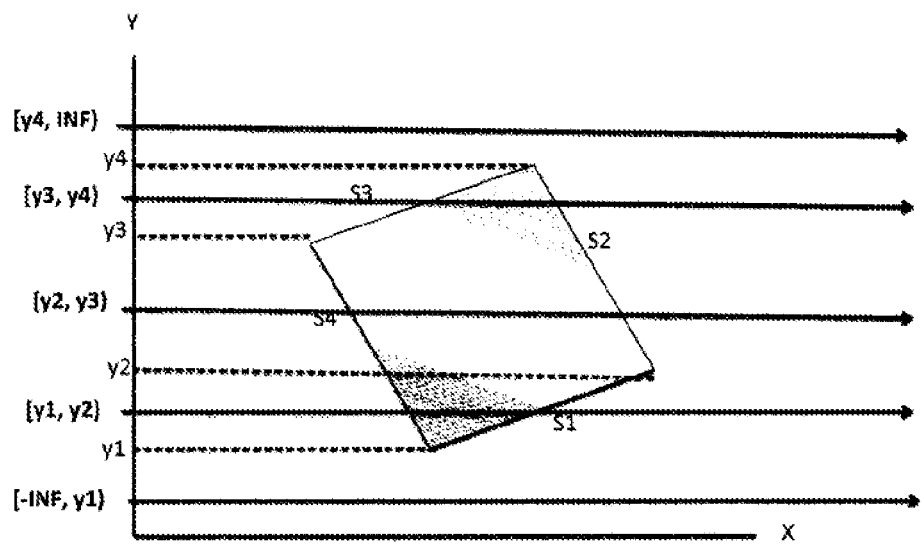
FIG. 10 illustrates horizontal rays cast in each Y-range in accordance with the disclosed embodiments.

FIG. 10 illustrates each of the 5 ranges, and a horizontal ray cast through each range. One can easily validate from the image in FIG. 10 that the list of open segments for each range, as shown in Table 4, accurately describes the set of segments intersected by a given ray. For example, the ray in range [y3, y4) intersects S2 and S3. For each range of y-values, we have computed the set of intersections of a horizontal ray. Therefore, the list of open segments is actually a set of ray intersections for any ray in the given range.

Figure 11:
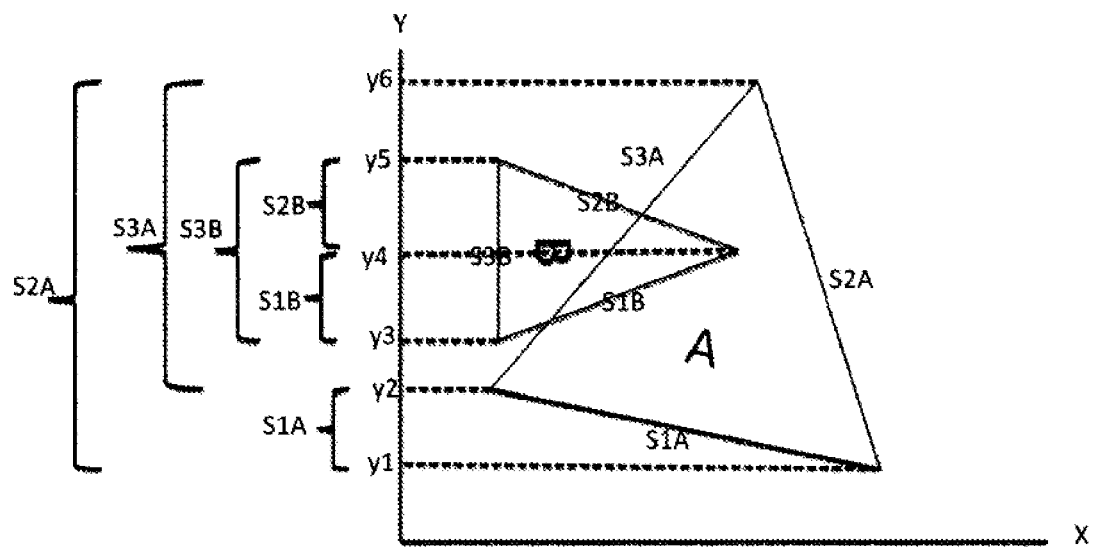
FIG. 11 illustrates segment projections with multiple polygons in accordance with the disclosed embodiments.

We can easily extend the above-described methodology to multiple polygons by including the identity of the polygon in the segmentId field. For example, FIG. 11 illustrates the case in which multiple polygons are projected onto the y-axis. Polygon A has segments with identity S1A, S2A, and S3A, and Polygon B has segments S1, S2B, and S3B.

Applying the above-described technique to the polygons shown in FIG. 10 yields the result that is displayed in Table 5. A comparison of Table 3 and Table 5 shows that, as one would expect, as more polygons are present, the set of ray intersections becomes larger for a given range.

TABLE 5

~~{S1A, —, y1, O}: [S1A]~~
{S2A, —, y1, O}: [S1A, S2A]
~~{S3A, —, y2, O}: [S1A, S2A, S3A]~~
{S1A, —, y2, C}: [S2A, S3A]
~~{S1B, —, y3, O}: [S2A, S3A, S1B]~~
{S3B, —, y3, O}: [S2A, S3A, S1B, S3B]
~~{S2B, —, y4, O}: [S2A, S3A, S1B, S3B, S2B]~~
{S1B, —, y4, C}: [S2A, S3A, S3B, S2B]
~~{S2B, —, y5, C}: [S2A, S3A, S3B]~~
{S3B, —, y5, C}: [S2A, S3A]
~~{S2A, —, y6, C}: [S3A]~~
{S3A, —, y6, C}: [ ]

We now describe a technique for minimizing the storage of ray intersection lists because the lists themselves can grow large and tend to be duplicative with respect to their neighboring lists. This is accomplished by storing 1 of every K ray intersection lists, and using the point data structure to update a stored intersection list at runtime. That is, the intersection list is stored modulo K. In this variation, the point data structure must be stored for each point and is used at runtime to update a stored ray intersection set to the desired y-range. For example, Table 6 below illustrates polygons of FIG. 11 stored with K=3 (modulo 3). Note how only one of every three intersection sets is not struck out, and also note that no point structures are struck out. The modulo parameter K provides a practical tradeoff between space in the index and the runtime cost of updating a stored ray to the desired y-range. In practice, a K value as large as 1024 can be used. For very large K values the storage space required for the index is approximately the same as for the polygons themselves.

We now describe the process of determining the set of intersected segments of a horizontal ray at an arbitrary height, given the modulo style of index storage. Given a desired ray height of y, the sorted point structure is binary searched to determine the point having a stored ray, and a y value less than or equal to the desired y value. In essence, the system retrieves a ray that is parallel to, but lower than the desired ray. This lower ray is then raised to the desired height using the opening and closing technique. When a point is reached having a y value greater than the desired height, the technique terminates.

TABLE 6

{S1A, —, y1, O}: S1A
{S2A, —, y1, O} ~~[S1A, S2A]~~
{S3A, —, y2, O} ~~[S1A, S2A, S3A]~~
{S1A, —, y2, C}: [S2A, S3A]
{S1B, —, y3, O} ~~[S2A, S3A, S1B]~~
{S3B, —, y3, O} ~~[S2A, S3A, S1B, S3B]~~
{S2B, —, y4, O}: [S2A, S3A, S1B, S3B, S2B]
{S1B, —, y4, C} ~~[S2A, S3A, S3B, S2B]~~
{S2B, —, y5, C} ~~[S2A, S3A, S3B]~~
{S3B, —, y5, C}: [S2A, S3A]
{S2A, —, y6, C} ~~[S3A]~~
{S3A, —, y6, C} ~~[ ]~~

For example, consider a point at location {x,y} for which we want to answer the PIP question. Assume y falls in the range [y4, y5) of Table 6. Binary searching the point structure yields {S2B, --, y4, O}: [S2A, S3A, S1, S3B, S2B] because the point structure and ray are lower than or equal to the desired y. Correcting the ray using the following point structure {S1B, --, y4, C} updates the ray to [S2A, S3A, S3B, S2B], which is the correct set of intersections for a ray falling in the range [y4, y5). The next point structure, {S2B, --, y5, C} causes the updating to stop, because y5 is greater than the desired height.

Figure 12:
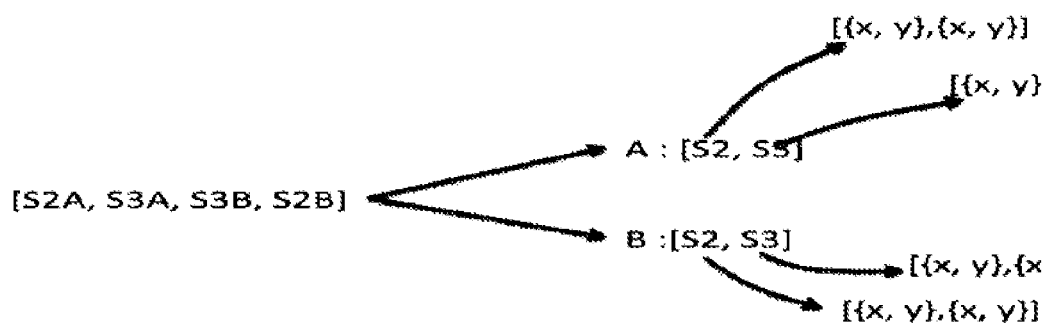
FIG. 12 illustrates a grouping of intersection sets by polygon identity in accordance with the disclosed embodiments.

The preceding disclosure describes how to retrieve a pre-cast ray from the index. Also, for the case of modulo indexing, we showed how to "correct" a stored ray to raise its height to the desired range. We now describe the step of how to apply the CN technique to the ray. The rays retrieved (and possibly corrected) from the index are cast from negative infinity in the X direction toward positive infinity in the X direction. The intersection sets, such as [S2A, S3A, S1B, S3B, S2B] are made of segment IDs that include the polygon identity (for instance "A" and "B"). Therefore, before feeding segments to the CN technique, we must first group them by polygonId. This is illustrated in FIG. 12. While we have heretofore described the elements of the intersection list as simple lists of segmentId values, we in fact store both the opening and closing point of each segment in conjunction with the segmentId. The reason for this is that a ray cast from negative infinity to positive infinity effectively includes two ray tests (we can think of this as a ray originating at the point to test, and emanating to positive infinity and the second ray originating at the point to test emanating to negative infinity). Because the CN test casts a single ray, we need the two points defining each line segment to determine which segments do not intersect the test ray, which we arbitrarily choose to be the one emanating to positive infinity.

Using the data illustrated in FIG. 12, the CN test first groups the segments by polygon. Then, for each set, the CN test counts segments that are intersected by the ray emanating to positive infinity. From this point, the output of the CN technique is of the standard form: if the count is odd, the point in question was inside the given polygon. If the count is even, the point in question was outside the given polygon.

In the technique presented so far, a ray must be retrieved (and corrected as needed) for each point to be tested. In practice, retrieving the ray and correcting it takes substantially longer (by orders of magnitude) than performing the CN technique on the retrieved set. The fact that the intersection set is invariant for a given range [ymin, ymax) allows for amortization of the intersection set retrieval and correction costs when a batch of points needs to be PIP tested. This can be accomplished by first sorting the points to be batch tested based on their y value. While processing the first point in the now-sorted batch, the corresponding ray can be retrieved and corrected from the index. For the second point, and all subsequent points to be tested, the ray can be incrementally corrected. That is to say, if the subsequent point to be tested still falls within the [ymin, ymax) range of the corrected ray, then no further action is required, and the CN technique, is again applied directly to the subsequent point. Subsequent points are processed until a point is encountered whose y value surpasses the upper extent of the ray's valid range (ymax). At this point, rather than performing a brand new query for a ray (which would require a binary search), one can simply continue to apply correction to the ray which requires forward iteration in the index, but not binary searching.

Note that in addition to determining which points fall within each polygon, the above-described technique can be modified to determine whether a given shape overlaps, intersects or encloses another shape by performing the technique for the points that define the given shape.

Process of Displaying Geographic Data

Figure 13:
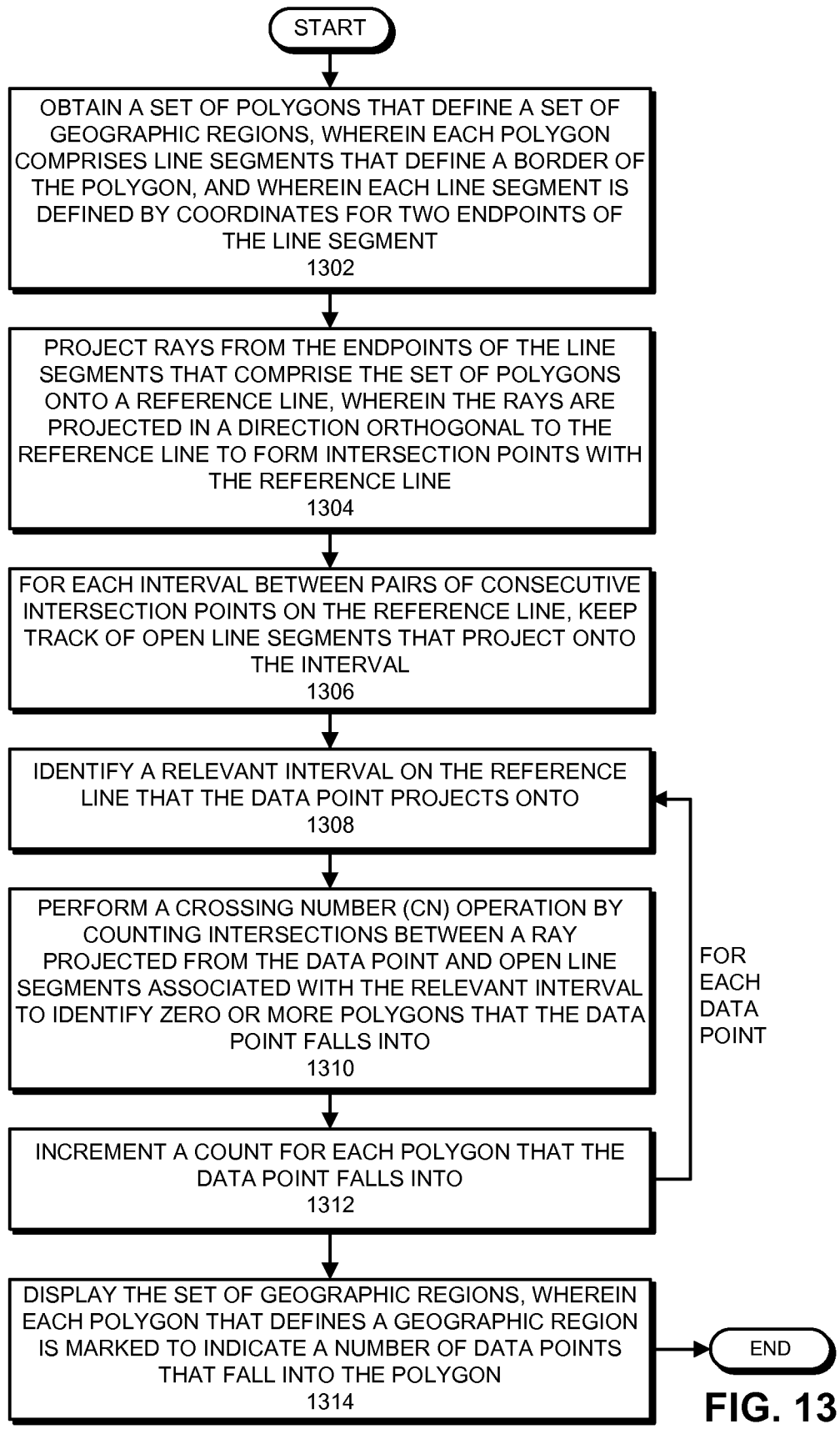
FIG. 13 presents a flow chart illustrating the process of displaying geographic data in accordance with the disclosed embodiments.

FIG. 13 presents a flow chart illustrating the process of displaying geographic data in accordance with the disclosed embodiments. At the start of the process, the system obtains a set of polygons that define a set of geographic regions, wherein each polygon comprises line segments that define a border of the polygon, and wherein each line segment is defined by coordinates for two endpoints of the line segment (step 1302). Next, the system projects rays from the endpoints of the line segments that comprise the set of polygons onto a reference line, wherein the rays are projected in a direction orthogonal to the reference line to form intersection points with the reference line (step 1304). (In some embodiments, the reference line is the y-axis in a Cartesian coordinate system and the rays are projected horizontally parallel to the x-axis.) Then, for each interval between pairs of consecutive intersection points on the reference line, the system keeps track of open line segments that project onto the interval (step 1306).

Next, for each data point in a set of data points to be processed, the system identifies a relevant interval on the reference line that the data point projects onto (step 1308), and performs a crossing number (CN) operation by counting intersections between a ray projected from the data point and open line segments associated with the relevant interval to identify zero or more polygons that the data point falls into (step 1310). The intersections can be detected by performing an intersection test using an equation for the line segment ($y=mx+b$) to see whether a ray projected from positive infinity to the data point intersects the line segment. If the reference line is the y-axis, the system can perform a simple initial filtering test to see whether both x coordinates of the line segment are less than the data point's x coordinate. This enables the system to throw out line segments that are obviously not intersected by the ray. The system then increments a count for each polygon that the data point falls into (step 1312).

Finally, the system displays the set of geographic regions, wherein each polygon that defines a geographic region is marked to indicate a number of data points that fall into the polygon (step 1314).

Process of Performing a Geofencing Operation

Figure 14:
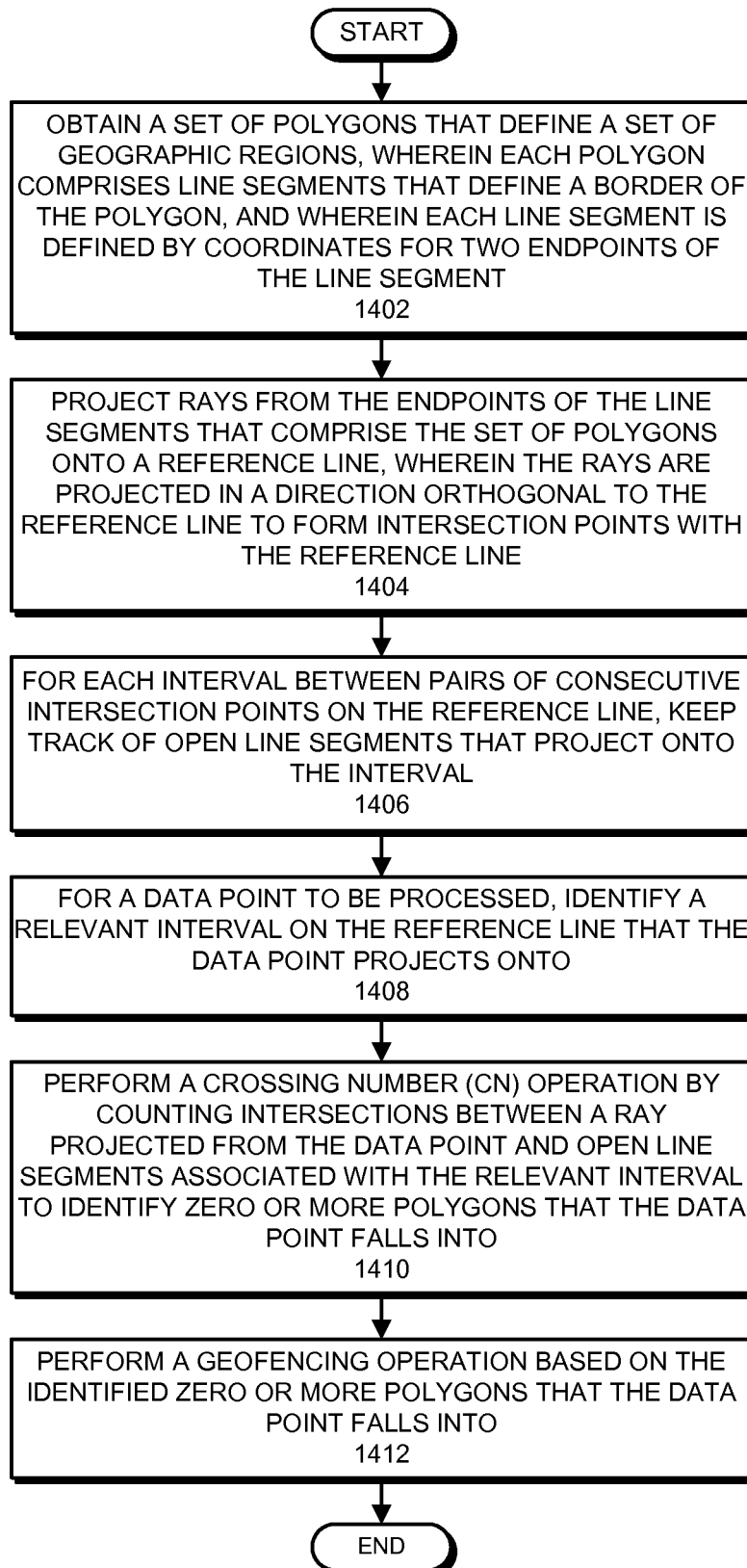
FIG. 14 presents a flow chart illustrating the process of performing a geofencing operation in accordance with the disclosed embodiments.

FIG. 14 presents a flow chart illustrating the process of performing a geofencing operation in accordance with the disclosed embodiments. At the start of this process, the system obtains a set of polygons that define a set of geographic regions, wherein each polygon comprises line segments that define a border of the polygon, and wherein each line segment is defined by coordinates for two endpoints of the line segment (step 1402). Next, the system projects rays from the endpoints of the line segments that comprise the set of polygons onto a reference line, wherein the rays are projected in a direction orthogonal to the reference line to form intersection points with the reference line (step 1404). Then, for each interval between pairs of consecutive intersection points on the reference line, the system keeps track of open line segments that project onto the interval (step 1406).

Next, for a data point to be processed, the system identifies a relevant interval on the reference line that the data point projects onto (step 1408). The system subsequently performs a crossing number (CN) operation by counting intersections between a ray projected from the data point and open line segments associated with the relevant interval to identify zero or more polygons that the data point falls into (step 1410). Finally, the system performs a geofencing operation based on the identified zero or more polygons that the data point falls into (step 1412). For example, the geofencing operation can involve sending a notification to a user when the user's location (obtained from the user's phone) indicates that the user has crossed a geofence boundary associated with a restricted security area.

Processing a Query Involving Geographic Information

Figure 15:
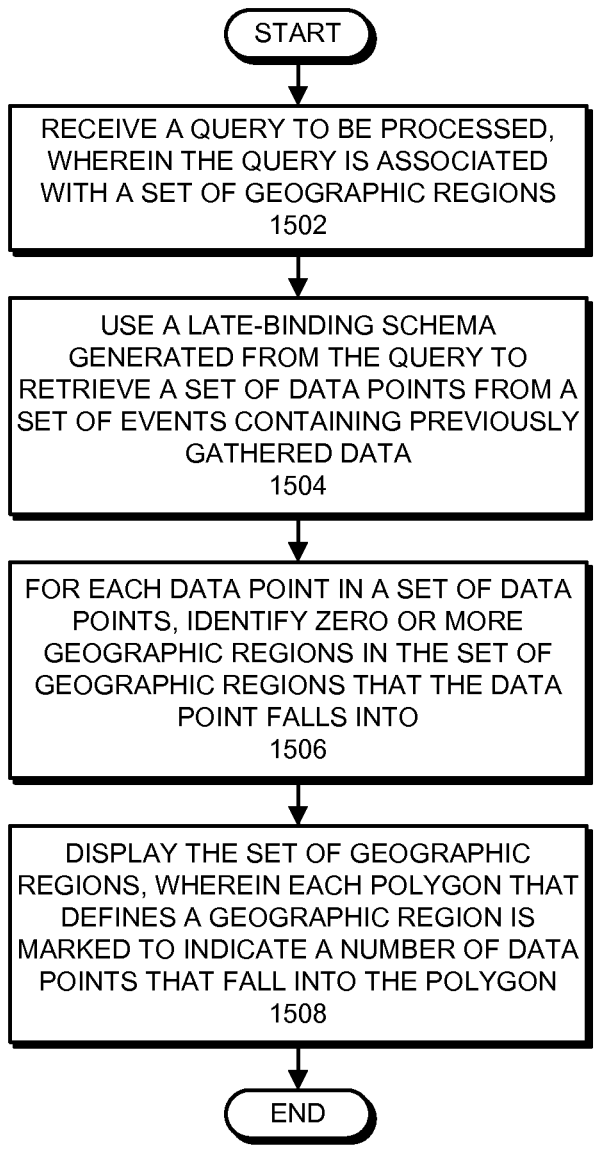
FIG. 15 presents a flow chart illustrating the processing of a query involving geographic data in accordance with the disclosed embodiments.

FIG. 15 presents a flow chart illustrating the processing of a query involving geographic information in accordance with the disclosed embodiments. First, the system receives the query to be processed, wherein the query is associated with a set of geographic regions (step 1502). Next, the system uses a late-binding schema generated from the query to retrieve data points from a set of events containing previously gathered data (step 1504). For example, if the query asks to count the population in each state in the United States, the late-binding schema can retrieve residence locations for people from a set of event data. Then, for each for each data point in a set of data points, the system identifies zero or more geographic regions in the set of geographic regions that the data point falls into (step 1506). Finally, the system displays the set of geographic regions, wherein each polygon that defines a geographic region is marked to indicate a number of data points that fall into the polygon (step 1508).

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

What is claimed is:

1. A computer-implemented method for visualizing location of a data point relative to a bound geometric region, comprising:
   casting parallel rays from segment endpoints of the bound geometric region onto a reference line to generate intersection points between the parallel rays and the reference line;
   storing in an index at least a subset of the parallel rays as point data structures, the point data structures corresponding to the intersection points, and associated open line segments of the bound geometric region;
   obtaining, from the index, one of the point data structures and an associated set of the open line segments based on a test ray cast from the data point falling in a range of the reference line associated with the point data structure;
   determining whether the data point is bounded by the geometric region by counting intersections between the test ray and the open line segments in the associated set; and
   causing a presentation of a visual representation of whether the data point is bounded by the geometric region.

2. The computer-implemented method of claim 1, wherein causing the presentation of the visual representation of whether the data point is bounded by the geometric region includes causing a presentation of a choropleth map wherein the geographic region is shaded, patterned or colored in proportion to a number of data points bounded by the geographic region.

3. The computer-implemented method of claim 1, wherein the reference line is an X coordinate axis.

4. The computer-implemented method of claim 1, wherein the reference line is a Y coordinate axis.

5. The computer-implemented method of claim 1, wherein obtaining the cast ray from the parallel rays in the index includes performing a binary search through an array containing the intersection points on the reference line.

6. The computer-implemented method of claim 1, wherein storing the subset of the parallel rays in the index includes maintaining a list of open line segments for every nth interval on the reference line.

7. The computer-implemented method of claim 1,
   wherein storing the subset of the parallel rays in the index includes maintaining a list of open line segments for every nth interval on the reference line; and
   wherein obtaining the cast ray and the associated set of open line segments includes obtaining a list of open line segments for a nearest nth interval on the reference line, and adjusting the list to account for intervening line segment openings and closings associated with intersection points located between the nearest nth interval and a relevant interval on the reference line corresponding to the test ray cast, to produce a list of open line segments for the relevant interval.

8. The computer-implemented method of claim 1,
   wherein the data point is one of a plurality of data points to be tested;
   wherein prior to determining whether the data point is bounded by the geometric region, the plurality of data points is sorted based on an ordering of rays cast from the plurality of data points on the reference line; and
   wherein the plurality of data points are processed in the sorted order to facilitate reducing an average amount of time required to identify a relevant interval for each data point.

9. The computer-implemented method of claim 1, wherein prior to determining whether the data point is bounded by the geometric region, the method further comprises obtaining the data point by:
   receiving a query to be processed, wherein the query is associated with the geographic region; and
   using a late-binding schema generated from the query to retrieve the data point from a set of events containing previously gathered data.

10. The computer-implemented method of claim 1, additionally comprising retrieving the geometric region from a geographic database.

11. A non-transitory computer-readable storage medium storing instructions that when executed by a computer cause the computer to perform a method for visualizing location of a data point relative to a bound geometric region, the method comprising:
    casting parallel rays from segment endpoints of the bound geometric region onto a reference line to generate intersection points between the parallel rays and the reference line;
    storing in an index at least a subset of the parallel rays as point data structures, the point data structures corresponding to the intersection points, and associated open line segments of the bound geometric region;
    obtaining a cast ray from the parallel rays in the index and an associated set of open line segments, the obtained cast ray corresponding to a range of the reference line on which a test ray cast from the data point in a direction parallel to the parallel rays falls;
    determining whether the data point is bounded by the geometric region by counting intersections between the test ray and the open line segments in the associated set; and
    causing a presentation of a visual representation of whether the data point is bounded by the geometric region.

12. The non-transitory computer-readable storage medium of claim 11, wherein causing the presentation of the visual representation of whether the data point is bounded by the geometric region includes causing a presentation of a choropleth map wherein the geographic region is shaded, patterned or colored in proportion to a number of data points bounded by the geographic region.

13. The non-transitory computer-readable storage medium of claim 11, wherein the reference line is an X coordinate axis.

14. The non-transitory computer-readable storage medium of claim 11, wherein the reference line is a Y coordinate axis.

15. The non-transitory computer-readable storage medium of claim 11, wherein obtaining the cast ray from the parallel rays in the index includes performing a binary search through an array containing the intersection points on the reference line.

16. The non-transitory computer-readable storage medium of claim 11, wherein storing the subset of the parallel rays in the index includes maintaining a list of open line segments for every nth interval on the reference line.

17. The non-transitory computer-readable storage medium of claim 11, wherein storing the subset of the parallel rays in the index includes maintaining a list of open line segments for every nth interval on the reference line; and wherein obtaining the cast ray and the associated set of open line segments includes obtaining a list of open line segments for a nearest nth interval on the reference line, and adjusting the list to account for intervening line segment openings and closings associated with intersection points located between the nearest nth interval and a relevant interval on the reference line corresponding to the test ray, to produce a list of open line segments for the relevant interval.

18. The non-transitory computer-readable storage medium of claim 11,
wherein the data point is one of a plurality of data points to be tested;
wherein prior to determining whether the data point is bounded by the geometric region, the plurality of data points is sorted based on an ordering of rays cast from the plurality of data points on the reference line; and
wherein the plurality of data points are processed in the sorted order to facilitate reducing an average amount of time required to identify a relevant interval for each data point.

19. The non-transitory computer-readable storage medium of claim 11, wherein prior to determining whether the data point is bounded by the geometric region, the method further comprises obtaining the data point by:
receiving a query to be processed, wherein the query is associated with the geographic region; and
using a late-binding schema generated from the query to retrieve the data point from a set of events containing previously gathered data.

20. The non-transitory computer-readable storage medium of claim 11, the method additionally comprising retrieving the geometric region from a geographic database.

21. A system for visualizing location of a data point relative to a bound geometric region, comprising:
at least one processor and at least one associated memory; and a display mechanism that executes on the at least one processor and is configured to:
cast parallel rays from segment endpoints of the bound geometric region onto a reference line to generate intersection points between the parallel rays and the reference line;
store in an index at least a subset of the parallel rays as point data structures, the point data structures corresponding to the intersection points, and associated open line segments of the bound geometric region;
obtain a cast ray from the parallel rays in the index and an associated set of open line segments, the obtained cast ray corresponding to a range of the reference line on which a test ray cast from the data point in a direction parallel to the parallel rays falls;
determine whether the data point is bounded by the geometric region by counting intersections between the test ray and the open line segments in the associated set; and
cause a presentation of a visual representation of whether the data point is bounded by the geometric region.

22. The system of claim 21, wherein while causing the presentation of the visual representation of whether the data point is bounded by the geometric region, the display mechanism is configured to cause a presentation of a choropleth map wherein the geographic region is shaded, patterned or colored in proportion to a number of data points bounded by the geographic region.

23. The system of claim 21, wherein the reference line is an X coordinate axis.

24. The system of claim 21, wherein the reference line is a Y coordinate axis.

25. The system of claim 21, wherein while obtaining the cast ray from the parallel rays in the index, the display mechanism is configured to perform a binary search through an array containing the intersection points on the reference line.

26. The system of claim 21, wherein while storing the subset of the parallel rays in the index, the display mechanism is configured to maintain a list of open line segments for every nth interval on the reference line.

27. The system of claim 21,
wherein while storing the subset of the parallel rays in the index, the display mechanism is configured to maintain a list of open line segments for every nth interval on the reference line; and
wherein while obtaining the cast ray and the associated set of open line segments, the display mechanism is configured to,
obtain a list of open line segments for a nearest nth interval on the reference line, and
adjust the list to account for intervening line segment openings and closings associated with intersection points located between the nearest nth interval and a relevant interval on the reference line corresponding to the test ray, to produce a list of open line segments for the relevant interval.

28. The system of claim 21,
wherein the data point is one of a plurality of data points to be tested;
wherein prior to determining whether the data point is bounded by the geometric region, the display mechanism is configured to sort the plurality of data points based on an ordering of rays cast from the plurality of data points on the reference line; and
wherein the display mechanism is configured to process the plurality of data points in the sorted order to facilitate reducing an average amount of time required to identify a relevant interval for each data point.

29. The system of claim 21, wherein prior to determining whether the data point is bounded by the geometric region, the system is further configured to:
receive a query to be processed, wherein the query is associated with the geographic region; and
use a late-binding schema generated from the query to retrieve the data point from a set of events containing previously gathered data.

30. The system of claim 21, wherein the system is further configured to retrieve the geometric region from a geographic database.

* * * * *